Jan. 13, 1959  J. W. F. HOLL  2,868,337
TORQUE ACTUATED VEHICLE BRAKE
Filed March 10, 1955  2 Sheets-Sheet 2

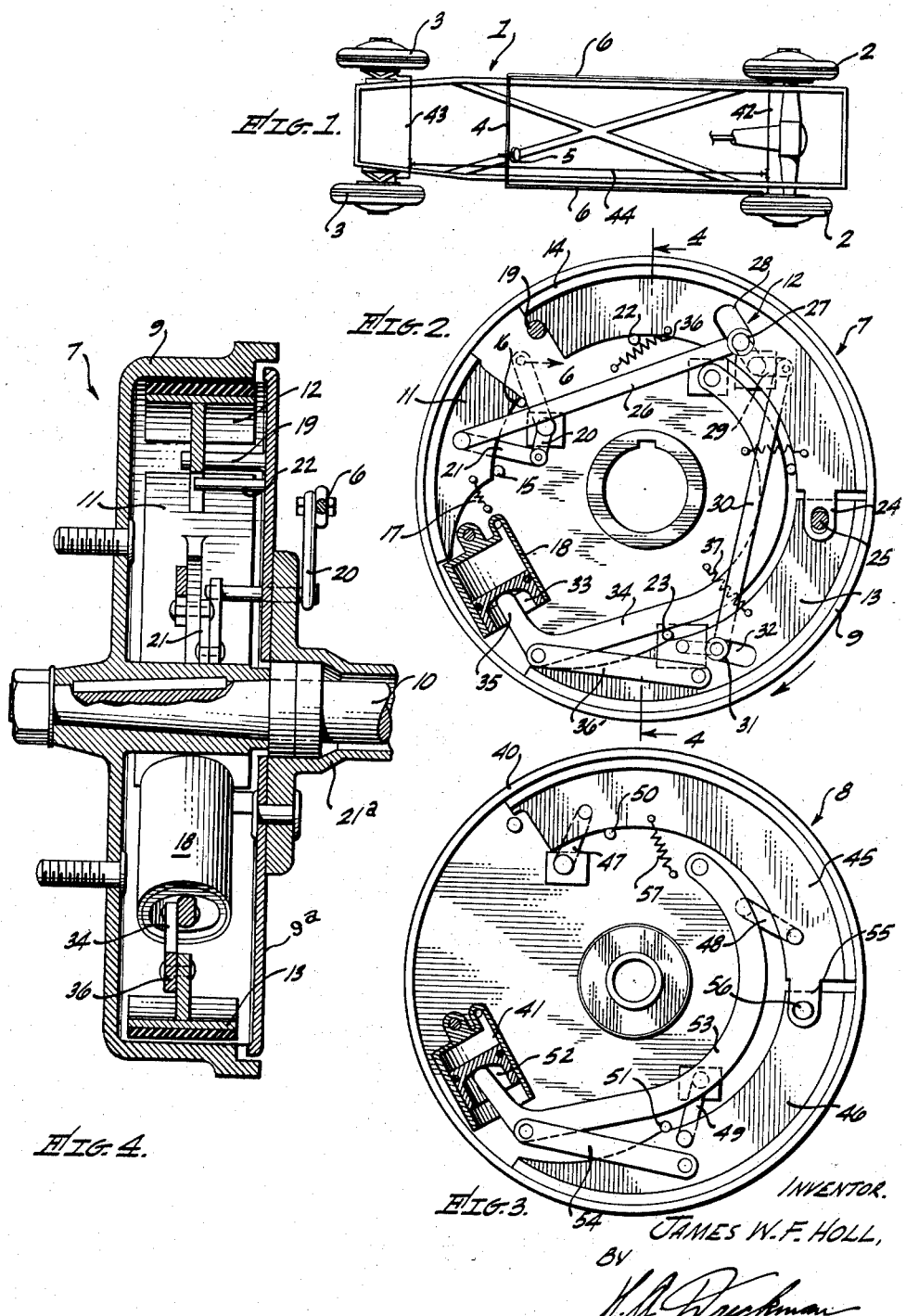

INVENTOR.
JAMES W. F. HOLL,
BY
ATTORNEY.

United States Patent Office 2,868,337
Patented Jan. 13, 1959

2,868,337

TORQUE ACTUATED VEHICLE BRAKE

James W. F. Holl, Temple City, Calif.

Application March 10, 1955, Serial No. 493,397

7 Claims. (Cl. 188—140)

This invention relates to a means for braking the wheels of a vehicle, and particularly a means of actuating the brakes from the partial rotation of a brake shoe in one or more of the vehicle brakes. My invention further relates to a torque equalizing means for communicating a uniform braking torque to each wheel of the vehicle.

The prime object of my invention is to provide a brake system for vehicles in which the brake shoes are pressed against the brake drum by the partial rotation of one of the brake shoes, which actuates links extending to the other shoes in the brake; the movement of the brake shoes in the brake as they are applied exerting a hydraulic pressure in a cylinder, this hydraulic pressure being transmitted to other brakes on the vehicle to actuate these other brakes.

Another object of my invention is to apply an equal braking torque to each wheel of the vehicle by providing a means for effecting engagement between a brake shoe and a brake drum, which will insure the application of an equal braking torque to each wheel of the vehicle by varying the normal force acting as the interface between the brake shoe and the brake drum, to compensate for variations of the coefficiency of friction existing therebetween.

A feature of my invention is the provision of a braking means which requires little or no compensation for wear and maladjustment.

Still another object of my invention is to provide a brake in which very little operator effort is required to apply the brake shoes.

This invention is an improvement on my prior Patent No. 2,471,956, issued May 31, 1949, for "Torque Equalizing Braking Apparatus."

Other objects, advantages and features of invention may appear from the accompanying drawing, the subjoined detailed description and the appended claims.

In the drawing:

Figure 1 is a plan view of the frame and wheels of a vehicle illustrating an application of my invention thereto.

Figure 2 is a side elevation of a rear wheel brake illustrating my invention and with parts thereof shown in section.

Figure 3 is a side elevation of a front wheel brake illustrating my invention and with parts shown in section.

Figure 4 is a sectional view taken on the line 4—4 of Fig. 2.

Figure 5:
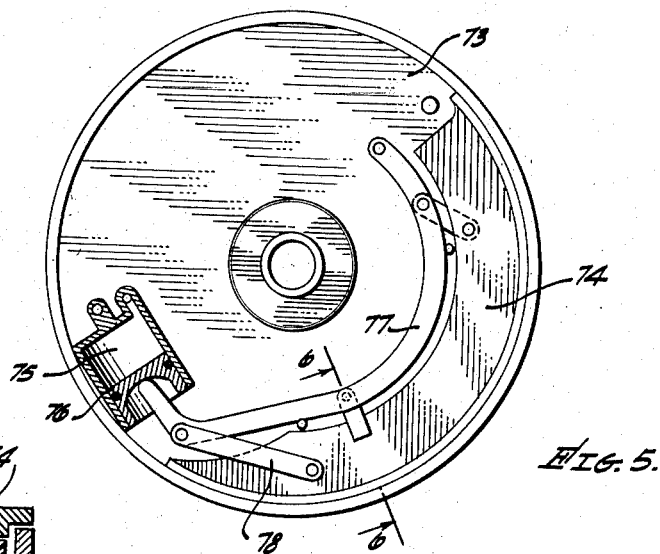
Figure 5 is a side elevation of a modified front wheel brake assembly.

Referring more particularly to the drawing, the vehicle frame is indicated at 1, which is supported on the rear wheels 2—2 and the front wheels 3—3. The wheels are mounted on the usual axles, which are usual and well known in the art. A shaft 4 is rotatably mounted on the frame 1 and is actuated by the brake pedal 5. By depressing the brake pedal 5 the shaft is rotated which, in turn, moves the actuating rods 6—6 longitudinally. The brake rods 6 are each connected to one of the rear brake assemblies 7, which will be described in greater detail. The front wheels each include the brake assemblies 8, which will be subsequently described in greater detail. In general, the rear brake assemblies 7 actuate the front brake assemblies 8, as will be evident from the following description:

Considering first the rear brake assemblies, and since these are identical only one will be described in detail. The brake drum 9 is mounted on the axle 10 in the usual and well known manner. Positioned within the drum 9 is an actuating shoe 11 and the braking shoes 12 and 13. These shoes are each arcuate in shape and are each provided with a brake lining or surface 14, all of which is usual and well known in the art. The actuating shoe 11 has a limited rotative movement within the drum 9 and is guided in this movement on the pins 15 and 16. A spring 17 normally urges the actuating shoe 11 to the position shown in Figure 2. In this retracted position the lower edge of the shoe engages a hydraulic cylinder 18 which is fixedly mounted within the drum 9. That is, the cylinder is attached to the brake disk 9a which is secured to the axle housing in the usual and well known manner. A stop pin 19, projecting inwardly from the disc 9a serves as a stop for the upper limit of movement of the shoe 11. A bell crank 20 is rotatably mounted in the axle housing 21a and the brake rod 6 is pivotally secured to this bell crank, so that the bell crank will be swung in its journal when the pedal 5 is depressed. This movement of the bell crank 20 will move the link 21 extending to the shoe 11. The link 21 is pivotally attached to the shoe 11 and on movement of the bell crank 20 this link will push the shoe 11 outwardly.

The drag of the shoe against the rotating drum 9 will cause the shoe 11 to move upwardly following the rotation of the drum. This rotative movement of the shoe 11 is transmitted into thrust against the brake shoes 12 and 13 in the following manner: The shoe 12 rests on pins 22 which project from the disc 9a, and the brake shoe 13 is similarly guided by the projecting pin 23. A blade 24 projects from the shoe 12 and an elongated hole in this blade fits over the pin 25 which projects from the shoe 13. A link 26 is pivotally attached at one end to the shoe 11 and at its other end a roller 27 fits in a cam slot 28 in the shoe 12. As the shoe 11 moves upwardly following the rotation of the drum 9 the link 26 will also be moved longitudinally and will cam the shoe 12 outwardly to engage the drum 9. This longitudinal movement of the link 26 will rotate the bell crank 29, which will move the link 30 longitudinally the same as the link 26. The link 30 is pivotally secured at one end to the bell crank 29 and at its other end is provided with a roller 31 which fits in the cam slot 32. Longitudinal movement of the link 30 will thus cam the shoe 13 outwardly to engage the drum 9 the same as the shoe 12. When the shoes 12 and 13 are both engaging the drum 9 they will also tend to rotate a very short distance, following the rotation of the drum. The rotation of the shoe 13 particularly will actuate the hydraulic system as follows:

The hydraulic cylinder 18 is mounted in the drum 9 adjacent the end of the shoe 13. A piston 33 is mounted in the cylinder 18. This piston can be moved in the cylinder to exert pressure against the hydraulic fluid in the cylinder in the following manner: The actuating lever 34 is pivotally mounted at one end to the disc 9a and a finger 35 at the other end bears against the piston 33. A link 36 is pivotally secured at one end to the shoe 13 and at the other end to the link 34, preferably at the base of the finger 35. The limited rotative movement of the shoe 13 will press the finger 35 upwardly and will thus cause the piston 33 to exert pressure against the fluid in the cylinder 18. A spring 36' normally urges the return of the shoe 12 to nonengaging position, and a similar spring 37 returns the shoe 13 to nonengaging position.

As thus far described the rear brakes have been set to a position engaging the drums by the brake pedal movement of the operator, which swings the actuating shoe 11 against the rotating brake drum, causing this actuating shoe to rotate a short distance with the brake drum 9, and by mechanical linkage the brake shoes 12 and 13 have been pressed against the rotating brake drum. Simultaneously, hydraulic pressure has been exerted in the cylinder 18. The front brake assemblies 8 are now actuated hydraulically in the following manner:

The front brake drum 40 is mounted on the front spindles of the vehicle, in the usual and well known manner. A hydraulic cylinder 41 is mounted in the brake drum 40 and all of the hydraulic cylinders 18 and 41 are connected in a single interconnected system by means of the pipe line 42, which connects the rear brakes, the pipe line 43 which connects the front brakes, and the pipe 44 connecting the pipes 42 and 43. Thus any pressure exerted in the cylinders 18 will be instantly transmitted to the cylinders 41. A pair of brake shoes 45 and 46 are mounted in the drum 40 in the following manner: A shoe 45 is mounted on pivoted links 47—48 and the shoe 46 is mounted on a pivoted link 49. Similarly, the shoe 45 is slidably mounted on pins 50 and the shoe 46 is similarly mounted on pins 51. Hydraulic pressure in the cylinder 41 will urge the piston 52 outwardly and will thus swing the link 53 on its pivot. Movement of the link 53 will also be imparted to the link 54 which, in turn, will press the shoe 46 outwardly against the drum 40. This movement of the shoe 46 outwardly against the drum 40 will also be imparted to the shoe 45 through the blade 55, which blade fits onto a pin 56 projecting from the shoe 46. Thus the shoes 45—46 are hydraulically set into braking position through the pressure exerted in the cylinders 41, as previously described. A spring 57 tends to retract the shoes 45—46 from engagement with the drum 40.

*In operation.*—When the brake pedal 5 is depressed the rods 6 are moved longitudinally, which will thus swing the bell crank lever 20. Rotation of the bell crank 20 will move the link 21 and push the actuating shoe 11 against the drum 9. The shoe 11 rotates a small distance with the drum 9 and this rotation will push the link 26 towards the shoe 12. This longitudinal movement of the link 26 will cam the shoe 12 outwardly into engagement with the drum 9. This movement of the link 26 will swing the bell crank 29 and will thus move the link 30 longitudinally, and this last link will cam the shoe 13 outwardly against the drum 9. Thus the brake shoes 12 and 13 are both pressed against the drum 9 to achieve a braking force.

The brake shoes 12 and 13 can both rotate slightly with the drum 9 as they are first engaged with the drum. This rotating movement of the shoes will cause the link 36 to press the finger 35 against the piston 33 and exert hydraulic pressure in not only the cylinders 18 of the rear wheels, but also the cylinders 41 of the front wheels. The cylinders 18 and 41 are all connected in a closed circuit and the hydraulic pressures will, therefore, be equal in all of the cylinders. Hydraulic pressure in the cylinders 41 will press the piston 52 outwardly, which will swing the link 53 on its pivot and this swinging movement will also push the link 54 longitudinally, thus pressing the shoe 46 against the brake drum 40. Outward movement of the shoe 46 will be imparted to the shoe 45 through the plate 55 and thus both shoes will be swung outwardly into engagement with the brake drum 40.

It will be evident that due to the equal hydraulic pressure in the cylinders 18 and 41 that the amount of brake torque exerted upon the rear wheels, as shown in Figure 2, will be equally transmitted to the front wheel assemblies, as shown in Figure 3. The shoe 11 also acts as the parking brake which can be mechanically set in the usual manner of the hand parking brakes.

Figure 6:
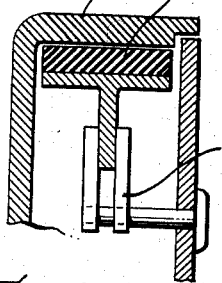
Figure 6 is a sectional view taken on line 6—6 of Figure 5.
Figure 7:
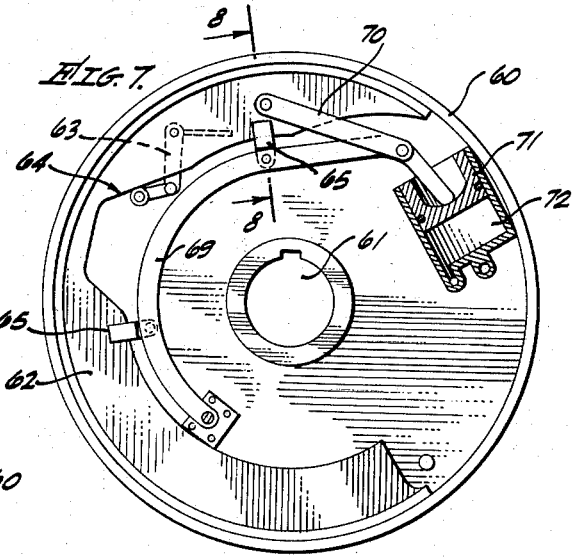
Figure 7 is a side elevation of a modified form of rear wheel brake assembly.
Figure 8:
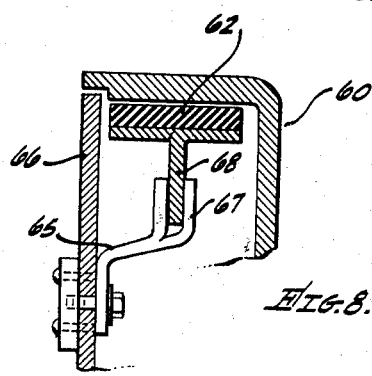
Figure 8 is a fragmentary sectional view taken on line 8—8 of Figure 7.

In the modified form of my invention shown in Figures 5 to 8, inclusive, in substantially the same manner as previously described, the rear wheel assemblies shown in Figures 7 and 8 actuate the front wheel assemblies shown in Figures 5 and 6. The rear assembly includes a brake drum 60 which is mounted on the vehicle axle 61 in the usual manner. A single arcuate brake shoe 62 is positioned within the drum 60. The brake shoe 62 is actuated by the brake pedal of the vehicle, the brake pedal rotating the bell crank lever 63 to engage the cam surface 64, and thus press the shoe 62 outwardly against the drum 60. The shoe 62 is properly guided and held in position by means of the brackets 65 which are bolted or otherwise secured to the stationary cover plate 66. The brackets 65 are bifurcated, as shown at 67, and the flange 68 of the shoe 62 fits into the bifurcation, thus holding the shoe in position. An actuating lever 69, similar to the lever 34 previously described, is pivotally mounted on the stationary plate of the brake assembly, and the other end of this lever is pivotally secured to the link 70, which link is pivotally attached at one end to the shoe 62 and the other end engages the piston 71 in the hydraulic cylinder 72. The cylinder 72 is filled with fluid in the same manner as previously described, and all of the hydraulic cylinders included in this brake system are all interconnected with suitable pipes. The front wheel assemblies include a drum 73, which is journaled on the front spindle of the vehicle. A single arcuate brake shoe 74 is positioned within the drum 73 and this brake shoe is pressed outwardly against the brake drum by hydraulic pressure in the following manner:

A hydraulic cylinder 75 is mounted adjacent one end of the shoe 74 and a piston 76 is mounted in this cylinder. A link 77 is pivotally mounted at one end on the stationary plate of the brake assembly and the other end of this link projects into and bears against the piston 76. A coupling link 78 is pivotally secured at one end to the link 77 and at the other end to the shoe 74. Thus as the piston 76 is pressed outwardly by hydraulic pressure the shoe 74 will be pressed outwardly against the drum 73. The brake shoe 74 is guided in its movement by the bifurcated bracket 79 which is also attached to the stationary plate of the brake and acts to guide the shoe 74 in its movement.

Having described my invention, I claim:

1. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, means extending from the first brake shoe to the second brake shoe whereby partial rotation of the first brake shoe with the brake drum will move the second brake shoe into frictional engagement with said brake drum, a third brake shoe, means mounting the third brake shoe adjacent the brake drum to frictionally engage the brake drum, means extending from the second brake shoe to the third brake shoe to move said third brake shoe into frictional engagement with the brake drum, a hydraulic cylinder, means mounting the hydraulic cylinder adjacent the brake drum, a piston in the hydraulic cylinder, link means extending from the third brake shoe to said piston to move said piston in the cylinder, and a pressure outlet pipe extending from said hydraulic cylinder.

2. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, said second brake shoe having a cam slot therein, a link pivotally secured at one end to the first brake shoe, the other end of said link projecting into the cam slot and slidable therein whereby partial rotation of the first brake shoe with the brake drum will move the second brake shoe into frictional engagement with said brake drum, a third brake shoe, means mounting the third brake shoe adjacent the brake drum to frictionally engage the brake drum, means extending from the second brake shoe to the third brake shoe to move said third brake shoe into frictional engagement with the brake drum, a hydraulic cylinder, means mounting the hydraulic cylinder adjacent the brake drum, a piston in the hydraulic cylinder, link means extending from the third brake shoe to said piston to move said piston in the cylinder, and a pressure outlet pipe extending from said hydraulic cylinder.

3. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, said second brake shoe having a cam slot therein, a link pivotally secured at one end to the first brake shoe, the other end of said link projecting into the cam slot and slidable therein whereby partial rotation of the first brake shoe with the brake drum will move the second brake shoe into frictional engagement with said brake drum, a third brake shoe, means mounting the third brake shoe adjacent the brake drum to frictionally engage the brake drum, a blade projecting from the second brake shoe, a pin projecting from the third brake shoe, said blade having an elongated slot therein to receive said pin, a hydraulic cylinder, means mounting the hydraulic cylinder adjacent the brake drum, a piston in the hydraulic cylinder, a link extending from the third brake shoe to said piston to move said piston in the cylinder, and a pressure outlet pipe extending from said hydraulic cylinder.

4. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, said second brake shoe having a cam slot therein, a link pivotally secured at one end to the first brake shoe, the other end of said link projecting into the cam slot and slidable therein whereby partial rotation of the first brake shoe with the brake drum will move the second brake shoe into frictional engagement with said brake drum, a third brake shoe, means mounting the third brake shoe adjacent the brake drum to frictionally engage the brake drum, a blade projecting from the second brake shoe, a pin projecting from the third brake shoe, said blade having an elongated slot therein to receive said pin, a bell crank adjacent the slot in said second shoe, said first named link being pivotally attached at one end to one arm of the bell crank, said third brake shoe having a cam slot therein, and another link extending from an arm of the bell crank to the last named cam slot and slidable in said cam slot, a hydraulic cylinder, means mounting the hydraulic cylinder adjacent the brake drum, a piston in the hydraulic cylinder, a link extending from the third brake shoe to said piston to move said piston in the cylinder, and a pressure outlet pipe extending from said hydraulic cylinder.

5. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, said second brake shoe having a cam slot therein, a link pivotally secured at one end to the first brake shoe, the other end of said link projecting into the cam slot and slidable therein whereby partial rotation of the first brake shoe with the brake drum will move the second brake shoe into frictional engagement with said brake drum, a third brake shoe, means mounting the third brake shoe adjacent the brake drum to frictionally engage the brake drum, means extending from the second brake shoe to the third brake shoe to move said third brake shoe into frictional engagement with the brake drum, a hydraulic cylinder, means mounting the hydraulic cylinder adjacent the brake drum, a piston in the hydraulic cylinder, an actuating lever, means pivotally mounting the actuating lever at one end thereof to a fixed plate on said axle, the other end of said actuating lever bearing against said piston, a link extending from the third brake shoe and pivotally attached to the actuating lever at one end thereof to move said piston in the cylinder, and a pressure outlet pipe extending from said hydraulic cylinder.

6. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, said second brake shoe having a cam slot therein, a link pivotally secured at one end to the first brake shoe, the other end of said link projecting into the cam slot and slidable therein whereby partial rotation of the first brake shoe with the brake drum will move the second brake shoe into frictional engagement with said brake drum, a third brake shoe, means mounting the third brake shoe adjacent the brake drum to frictionally engage the brake drum, a blade projecting from the second brake shoe, a pin projecting from the third brake shoe, said blade having an elongated slot therein to receive said pin, a hydraulic cylinder, means mounting the hydraulic cylinder adjacent the brake drum, a piston in the hydraulic cylinder, an actuating lever, means pivotally mounting the actuating lever at one end thereof to a fixed plate on said axle, the other end of said actuating lever bearing against said piston, a link extending from the third brake shoe and pivotally attached to the actuating lever at one end thereof to move said piston in the cylinder, and a pressure outlet pipe extending from said hydraulic cylinder.

7. A torque actuated vehicle brake including a supporting structure comprising an axle, and a brake drum rotatable about said axle, a first brake shoe adapted to frictionally engage said brake drum, means mounting said first brake shoe for partial rotation with the brake drum when frictionally engaging the same, a second brake shoe, means mounting the second brake shoe adjacent the brake drum to frictionally engage the brake drum, said second brake shoe having a cam slot therein, a link pivotally secured at one end to the first brake shoe, the other end of said link projecting into the cam slot and slidable therein whereby partial rotation of the first brake shoe with the brake drum will move the second brake shoe into frictional engagement with said brake drum, a third brake shoe, means mounting the third brake shoe adjacent the brake drum to frictionally engage the brake drum, a blade projecting from the second brake shoe, a pin projecting from the third brake shoe, said blade having an elongated slot therein to receive said pin, a bell crank adjacent the slot in said second shoe, said first named link being pivotally attached at one end to one arm of the bell crank, said third brake shoe having a cam slot therein, and another link extending from an arm of the bell crank to the last named cam slot and slidable in said cam slot, a hydraulic cylinder, means mounting the hydraulic cylinder adjacent the brake drum, a piston in the hydraulic cylinder, an actuating lever, means pivotally mounting the actuating lever at one end thereof to a fixed plate on said axle, the other end of said actuating lever bearing against said piston, a link extending from the third brake shoe and pivotally attached to the actuating lever at one end thereof to move said piston in the cylinder, and a pressure outlet pipe extending from said hydraulic cylinder.

References Cited in the file of this patent

UNITED STATES PATENTS

| | | | |
|---|---|---|---|
| 1,659,811 | Dick | Feb. 21, | 1928 |
| 1,736,046 | Madden | Nov. 19, | 1929 |
| 1,758,139 | Blackmore | May 13, | 1930 |
| 2,070,470 | Clench | Feb. 9, | 1937 |
| 2,147,082 | Beusch | Feb. 14, | 1939 |
| 2,237,650 | Brisson | Apr. 8, | 1941 |
| 2,471,956 | Holl | May 31, | 1949 |

FOREIGN PATENTS

| | | | |
|---|---|---|---|
| 747,991 | France | Apr. 10, | 1933 |